(12) United States Patent
Hawkins

(10) Patent No.: US 8,464,999 B2
(45) Date of Patent: Jun. 18, 2013

(54) SERVICE REGULATOR VENT

(75) Inventor: James C. Hawkins, Allen, TX (US)

(73) Assignee: Fisher Controls International LLC, St. Louis, MO (US)

( * ) Notice: Subject to any disclaimer, the term of this patent is extended or adjusted under 35 U.S.C. 154(b) by 796 days.

(21) Appl. No.: 12/105,862

(22) Filed: Apr. 18, 2008

(65) Prior Publication Data
US 2008/0258099 A1 Oct. 23, 2008

Related U.S. Application Data

(60) Provisional application No. 60/913,130, filed on Apr. 20, 2007.

(51) Int. Cl.
*F16K 31/12* (2006.01)
(52) U.S. Cl.
USPC ....... 251/58; 251/335.2; 251/367; 137/116.5; 137/484.4; 137/505.46; 137/505.47
(58) Field of Classification Search
USPC .............. 251/58, 335.2, 366, 367; 137/116.5, 137/505.46, 505.47, 484.4
See application file for complete search history.

(56) References Cited

U.S. PATENT DOCUMENTS

| | | | | |
|---|---|---|---|---|
| 2,038,013 A | * | 4/1936 | Temple | 137/505.46 |
| 2,577,480 A | * | 12/1951 | Peterson | 137/484.8 |
| 3,098,499 A | * | 7/1963 | Schwerter | 137/463 |
| 3,488,685 A | * | 1/1970 | Hughes | 137/116.5 |
| 3,705,599 A | | 12/1972 | Sheward | |
| 4,067,355 A | * | 1/1978 | St. Clair | 137/458 |
| 4,195,656 A | | 4/1980 | Kanerva et al. | |
| 4,754,778 A | | 7/1988 | Duffy et al. | |
| 4,782,850 A | | 11/1988 | Duffy et al. | |
| 4,889,158 A | * | 12/1989 | Rice et al. | 137/484.4 |
| 5,810,029 A | * | 9/1998 | Speros et al. | 137/377 |

FOREIGN PATENT DOCUMENTS

| | | |
|---|---|---|
| JP | 56-164411 | 12/1981 |
| JP | 6-242837 | 9/1994 |

OTHER PUBLICATIONS

International Search Report for PCT/US2008/060868, mailed Aug. 5, 2008.
Written Opinion of the International Searching Authority for PCT/US2008/060868, mailed Aug. 5, 2008.
First Chinese Office Action for Application No. 200880012247.8, dated Jun. 13, 2011.
Second Chinese Office Action for Application No. 200880012247.8, dated Apr. 6, 2012.
Examination Report for European Application No. 08746307.1, dated Nov. 24, 2011.

(Continued)

*Primary Examiner* — John K Fristoe, Jr.
*Assistant Examiner* — Marina Tietjen
(74) *Attorney, Agent, or Firm* — Marshall, Gerstein & Borun LLP

(57) ABSTRACT

A fluid regulating device comprises an actuator with upper and lower housing components. The upper and lower housing components are secured together at mating flanges via a plurality of fasteners. The upper housing component is formed with a vent to contain a relief valve, which exhausts fluid to the atmosphere under overpressure conditions. The upper housing component is constructed such that it does not require a pedestal or fins extending between the vent and the flange, which advantageously provides a completely unobstructed, continuous, ring-shaped flange for receiving and manipulating the fasteners during assembly and/or maintenance of the regulating device.

24 Claims, 4 Drawing Sheets

OTHER PUBLICATIONS

Extended European Search Report for Application No. 12160551.3, dated Apr. 26, 2012.
Third Chinese Office Action for Application No. 200880012247.8, dated Dec. 3, 2012.
Office Action for Japanese Application No. 2010-504286, dated Aug. 7, 2012.
Australian Office Action for Application No. 2008242698, dated Nov. 26, 2010.

* cited by examiner

SERVICE REGULATOR VENT

CROSS-REFERENCE TO RELATED APPLICATIONS

The priority benefit of U.S. Provisional Patent Application No. 60/913,130, entitled "Service Regulator Vent," filed Apr. 20, 2007, is claimed and the entire contents thereof are expressly incorporated herein by reference.

FIELD OF THE INVENTION

The present invention relates to gas regulators, and more particularly, to gas regulators having relief valves for venting overpressure.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a relief valve. The relief valve is adapted to provide over pressure protection when the regulator or some other component of the fluid distribution system fails, for example. Accordingly, in the event the delivery pressure rises above a predetermined threshold pressure, the relief valve opens to vent at least a portion of the gas to the atmosphere, thereby reducing the pressure in the system.

FIG. 1 depicts one such conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example.

The actuator 12 is coupled to the regulator valve 14 to ensure that the pressure at the outlet 18 of the regulator valve 14, i.e., the outlet pressure, is in accordance with a desired outlet or control pressure. The actuator 12 includes a housing 20 and a control assembly 22. The housing 20 defines a cavity 21 containing at least a portion of the control assembly 22. The control assembly 22 is adapted for sensing and regulating the outlet pressure of the regulator valve 14. Specifically, the control assembly 22 includes a diaphragm 24, a piston 32, and a control arm 26 having a valve disc 28. The control assembly 22, and more particularly, the diaphragm 24 senses the outlet pressure of the regulator valve 14 and adjusts a position of the valve disc 28 to control the flow of fluid through the regulator valve 14.

More particularly, the diaphragm 24 is operably coupled to the control arm 26, and therefore, the valve disc 28 via the piston 32, and controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 24 senses this decreased outlet pressure and moves the piston 32 and the right-side of the control arm 26 downward, relative to the orientation of FIG. 1. This displacement of the control arm 26 moves the valve disc 28 to open the regulator valve 14. So configured, the appliance may draw gas toward the outlet 18 of the regulator valve 14.

In the conventional regulator 10 depicted in FIG. 1, the control assembly 22 further functions as a relief valve, as mentioned above. Specifically, the control assembly 22 also includes a relief spring 40 and a relief valve 42. The relief valve 42 is disposed within a vent 34 formed integrally with the housing 20 of the actuator 12. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation.

Upon the occurrence of a failure such as a break in the control arm 26, the control assembly 22 is no longer in direct control of the valve disc 28 and inlet flow through the regulator valve 14 will move the valve disc 28 move into an extreme open position. This allows a maximum amount of gas to flow into the actuator 12. Thus, as the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the relief valve 42.

The relief valve 42 includes a valve plug 46 and a release spring 54 biasing the valve plug 46 into a closed position, as depicted in FIG. 1. Upon the pressure within the actuator 12 and adjacent the relief valve 42 reaching a predetermined threshold pressure, the valve plug 46 displaces upward against the bias of the release spring 54 and opens, thereby exhausting gas into the atmosphere through the vent 34 and reducing the pressure in the regulator 10. In some embodiment, the vent 34 includes a plurality of internal threads 35 for being threadably connected to piping, to pipe the exhausted gas to a specific location.

Depending on the particular application of the regulator 10, the size of the vent 34 and the components of the relief valve 42 may vary. For example, applications requiring high capacity relief, may also require a higher capacity relief valve 42. High capacity relief valves are typically constructed similar to the relief valve 42 discussed above, with the exception that they are larger in size. Thus, the size of the vent 34 must also be increased to accommodate the larger relief valve.

FIG. 2 depicts an exterior of one conventional regulator housing 20 including a vent 34 configured to accommodate a low capacity relief valve, for example. The housing 20 includes an upper housing component 20a and a lower housing component 20b. The upper housing component 20a includes a shell portion 51 and an integrally defines the vent 34. The vent 34 includes a diameter, for example, of approximately 2 inches or less, for venting performance associated with the low capacity relief valve. Additionally, the upper and lower housing components 20a, 20b include flanges 25a, 25b extending around a perimeter thereof and which are secured together with a plurality of fasteners 36. The number and spacing of the fasteners 36 is dictated by the design of the regulator 10 such that the flanges 25a, 25b of the housing components 20a, 20b can effectively compress and seal the diaphragm 24 depicted in FIG. 1, thereby minimizing the opportunity for leakage and ensuring optimal operation. The fasteners 36 conventionally include threaded fasteners such as hexagonal bolts and nuts, as depicted.

The conventional housing components 20a, 20b are manufactured with a casting process, wherein a plurality of mold cores are positioned relative to one another to cooperatively define a mold cavity. The mold cavity defines the specific geometry of the housing components 20a, 20b. Due to the intricacies of casting, the upper housing component 20a of the conventional housing depicted in FIG. 20 is formed with a pedestal portion 31 directly between the vent 34 and the flange 25a. The pedestal portion 31 of the upper housing component 20a depicted in FIG. 2 is generally solid and disposed between a pair of adjacent fasteners 36. Not only is the solid pedestal portion 31 a product of the manufacturing process, but it can also provide structural support to the portion of the vent 34 disposed above the flange 25a of the upper housing component 20a.

In contrast, FIG. 3 depicts a partial exterior view of another conventional upper housing component 120a including a vent 134 configured to accommodate a high capacity relief valve. Thus, the vent 134 has a larger diameter than the vent 34 depicted in FIGS. 1 and 2, for example. The vent 134 may include a diameter of approximately 2 and ½ inches or more, for venting performance associated with the high capacity relief valve. Similar to the housing 20 discussed above, the upper housing component 120a depicted in FIG. 3 includes a shell portion 151 and a flange 125a extending around the perimeter of the shell portion 151. The flange 125a is adapted to be secured to a flange of a lower housing component (as shown in FIG. 1, for example) with a plurality of threaded fasteners 136.

Due to the increased size of the vent 134, two of the fasteners 136a, 136b must be positioned approximately below the vent 134 to provide a sufficiently uniform seal against the diaphragm that is disposed between the housing components. Accordingly, the upper housing component 120a depicted in FIG. 3 does not include a solid pedestal, such as the pedestal portion 34 depicted in FIG. 2, but rather, a pair of fins 131a, 131b. The fins 131a, 131b enable access to the flange 125a of the upper housing component 120a directly below the vent 134 such that the threaded fasteners 136a, 136b may be installed to secure the housing components together. Additionally, as with the pedestal portion 31 described above with reference to FIG. 2, the fins 131a, 131b can provide structural support to the portion of the vent 134 disposed above the flange 125a of the upper housing component 120a.

One shortcoming of the conventional designs of the upper housing components 20a, 120a is that the pedestal portion 31 and fins 131a, 131b tend to interfere with a technician tightening and/or loosening the threaded fasteners 36, 136a, 136b. For example, as depicted in FIG. 3, a technician may use a wrench or other similar tool to tighten or loosen the fasteners 36 while assembling or disassembling the regulator 10. The fins 131a, 131b can interfere with the free movement of the wrench and therefore it may take longer to tighten or loosen the fasteners 136a, 136b.

SUMMARY

The present invention provides a regulator comprising a regulator valve and an actuator. The actuator includes a housing that is coupled to the regulator valve and a control element for controlling the flow of gas through the regulator valve. The housing includes upper and lower components secured together about a peripheral flange with a plurality of threaded fasteners. The regulator also includes a relief valve for providing overpressure protection. The relief valve is disposed within a vent integrally formed within one of the housing components to enable gas to be exhausted to the atmosphere under overpressure conditions. The vent is sized and configured to minimize interference with installation and/or removal of the threaded fasteners. That is, the flange advantageously includes a completely unobstructed top surface for receiving a plurality of fasteners.

In one embodiment, the vent is configured to accommodate a high capacity relief valve.

Another aspect of the present invention provides a mold for manufacturing a housing component of an actuator of a regulator for accommodating a high capacity relief valve. The mold comprises a plurality of mold cores cooperatively defining the housing component including a peripheral flange and a vent. The flange advantageously includes a completely unobstructed top surface for receiving a plurality of fasteners.

DETAILED DESCRIPTION

Figure 4:
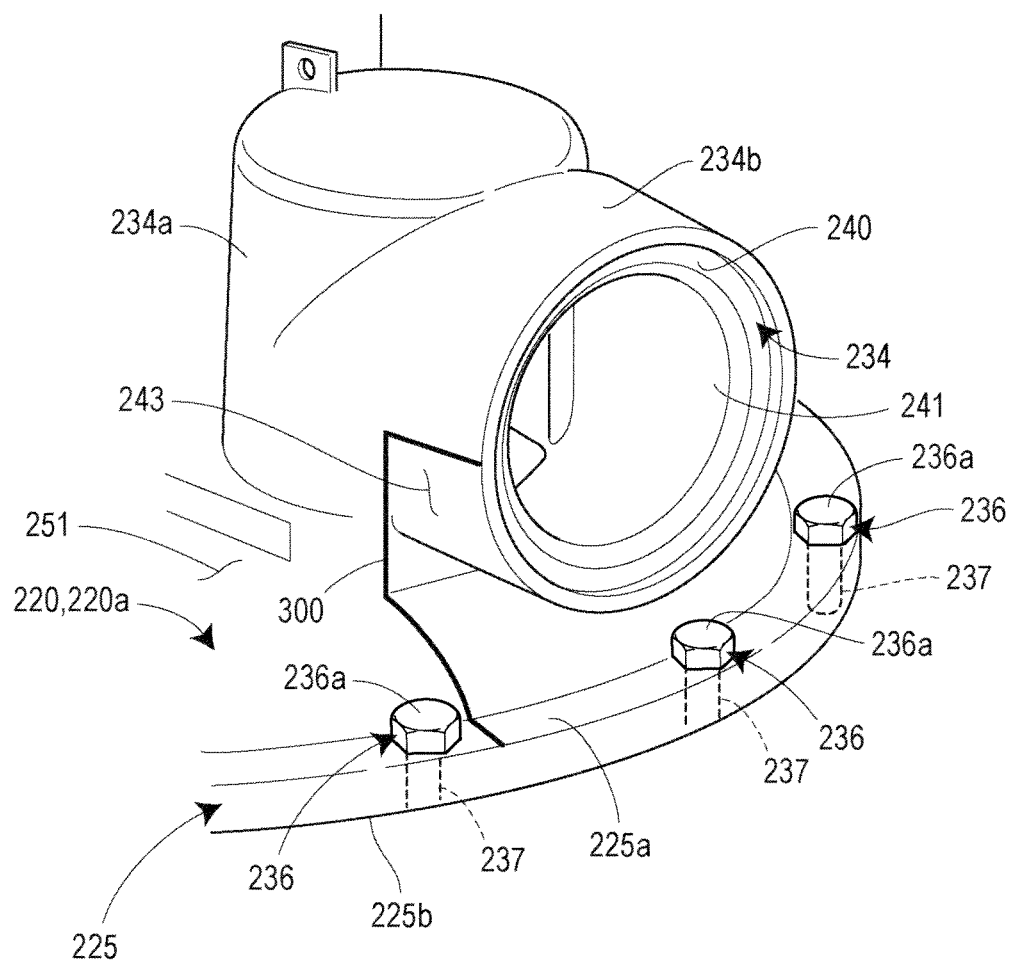
FIG. 4 is a partial perspective view of a regulator housing constructed in accordance with the principles of the present invention.

FIG. 4 depicts an exterior view of a regulator housing 220 including a vent 234 constructed in accordance with the principles of the present invention and configured to accommodate a high capacity relief valve, for example. To accommodate a high capacity relief valve, the vent 234 can include a diameter, for example, of approximately 2 and ½ inches or more. The housing 220 depicted in FIG. 4 may also be adapted, however, to accommodate a low capacity relief valve and, as such, can have a diameter less than 2 and ½ inches. Moreover, the housing 220 is adapted for use with the regulator discussed above with reference to FIG. 1.

Similar to the conventional housings 20, 120 discussed above with reference to FIGS. 1-3, the housing 220 of the present embodiment of the dsclosure includes an upper housing component 220a and a lower housing component (not shown), which may be similar to the lower housing component 20b disclosed with reference to FIG. 1.

The upper housing component 220a integrally defines a shell portion 251, the vent 234, and a flange 225. The flange 225 extends completely around the perimeter of the shell portion 251 of the upper housing component 220a and is adapted to be secured to a corresponding flange of a lower housing component such as flange 25b of the lower housing component 20b depicted in FIG. 1. For this purpose, the flange 225 includes a plurality of apertures 237 for receiving a plurality of fasteners 236. The fasteners 236 secure the upper housing component 220a to a lower housing component such as the lower housing component 20b depicted in FIG. 1, for example.

Figure 1:
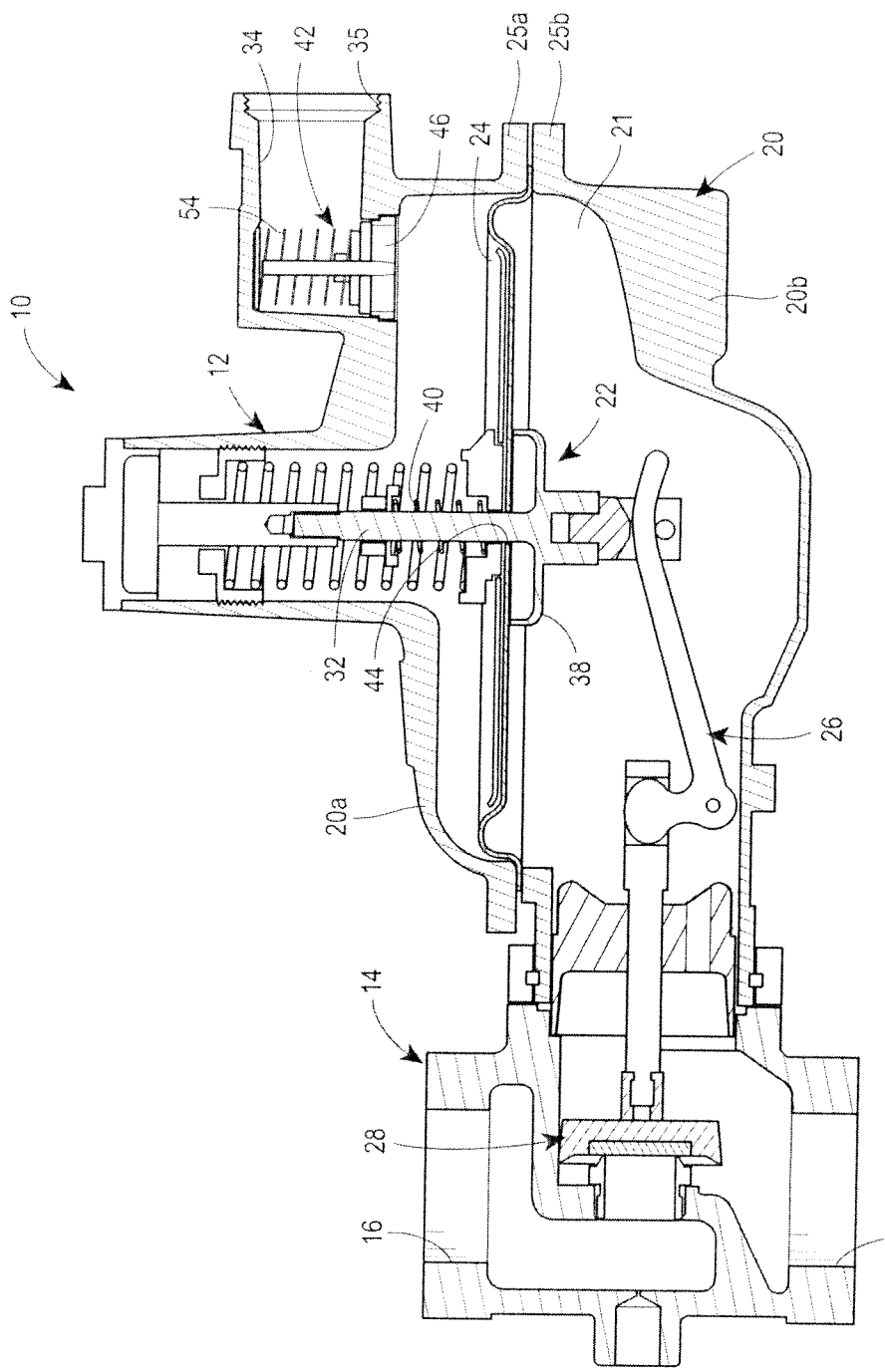
FIG. 1 is a side cross-sectional view of a regulator.

The number and spacing of the fasteners 236 is dictated by the design of the regulator such that the housing 220 effectively compresses and seals a diaphragm, such as the diaphragm 24 depicted in FIG. 1, between the flanges of the upper and lower housing components to minimize leakage and ensure optimal operation of the regulator. The fasteners 236 conventionally include threaded fasteners such as hexagonal bolts and nuts.

The flange 225 of the upper housing component 220a of the present embodiment includes a top surface 225a and a bottom surface 225b and, as mentioned, extends completely around the perimeter of the upper housing component 220a. In the disclosed embodiment, the upper housing component 220a can include a circular cross-section. Therefore, the flange 225 can comprise a circumferential flange extending around the circumference of the upper housing component 220a. The bottom surface 225b of the flange 225 is adapted to sealingly engage a peripheral portion of a diaphragm such as the diaphragm 24 depicted in FIG. 1. The top surface 225a is a continuous, completely unobstructed, ring-shaped surface that provides a surface, against which hexagonal heads 236a of the plurality of fasteners 236 abut. So provided, the entire top surface 225a of the flange 225 defines a seating surface for the fasteners 236.

The vent 234 of the upper housing component 220a depicted in FIG. 4 comprises a generally L-shaped conduit that provides for fluid communication from within the housing 220, as depicted in FIG. 1, and the atmosphere to exhaust fluid and provide overpressure protection under overpressure conditions in a manner similar to that described above with reference to the regulator 10 depicted in FIG. 1. The vent 234 of the present embodiment includes a generally hollow elbow (as shown in FIG. 1, for example) and is formed integrally, i.e., as one-piece, with the upper housing component 220a. The vent 234 includes an upright portion 234a and a coupling portion 234b disposed approximately perpendicular to each other. The upright portion 234a extends generally upward from the shell portion 251 of the upper housing component 220a. The coupling portion 234b extends from the upright portion 234a and over the top surface 225a of the flange 225, and spaced from the top surface 225a of the flange 225. Said another way, the coupling portion 234b is cantilevered from the upright portion 234a such that a portion of the coupling portion 234b is disposed unsupported above the top surface 225a of the flange 225. The coupling portion 234b includes a generally cylindrical outer surface 243 and defines an opening 240. The opening 240 is in direct communication with the atmosphere. The opening 240 is circular in cross-section and may be adapted to be coupled to piping such that exhaust from the vent 234 may be piped to a specific location. Thus, in one embodiment, an internal cylindrical surface 241 of the opening 240 may include a plurality of threads (not shown) adapted for threaded engagement with a threaded pipe or other pipe fitting. Therefore, the cylindrical surface 241 of the embodiment depicted in FIG. 4 can include a number of threads sufficient to threadably engage a pipe or other threaded coupling of approximately 2 and ½ inches or more.

As mentioned, the coupler portion 234b of the vent 234 includes a cylindrical outer surface 243. This cylindrical outer surface 243 is generally uniformly cylindrical between the opening 240 and the upright portion 234a of the vent 234. So configured, the coupling portion 234b does not include a pedestal, or fins, such as the pedestal portion 31 and fins 131a, 131b of the conventional housing components 20a, 120a disclosed above with reference to FIGS. 1-3. Thus, the top surface 225a of the flange 225 of the upper housing component 220a of the present embodiment is completely unobstructed, which advantageously enables uninterrupted and unfettered access to every head 236a of every fastener 236 disposed about the flange 225a of the upper housing component 220a. This advantageously allows a technician to more quickly assemble or disassemble an actuator housing of a regulator constructed in accordance with the principles of the present disclosure during the initial build, or subsequently, during field service to replace a diaphragm, a spring, or any other component.

The housing component 220a depicted in FIG. 4 may be manufactured by machining, casting, injection forming, or generally any other method. However, in utilizing a casting method of manufacturing, such casting would include a plurality of cores, each core defining a recess. So configured, positioning each of the cores relative to each other, the recesses in the cores cooperatively define a cavity which defines the specific geometry of the housing component 220a. Specifically, in one embodiment, the plurality of cores could come together to define a parting line that defines the specific geometry of the vent 234 and, particularly a parting line that conforms to line 300 depicted in FIG. 4. So configured, the core or cores conforming to the parting line 300 would advantageously define a cavity for the housing 220a which does not require the inclusion of a space for a pedestal portion or fins to be formed adjacent to the vent 234.

While the housing component 220a depicted in FIG. 4 has been described as enabling unobstructed access to the fasteners 236 by eliminating the pedestal portion and fins described above with reference to FIGS. 2 and 3, respectively, an alternative embodiment the housing component 220a can include a flange 225 having an enlarged radial dimension. In such an embodiment, the pedestal portion or fins may not have to be eliminated. For example, by increasing the radial dimension of the flange 225, the apertures 237 for receiving the fasteners 236 can be moved radially outward such that the fasteners would no longer be interfered with by a pedestal portion or fins. In this alternative embodiment, the top surface 225a of the enlarged flange 225 still has a continuous, and completely unobstructed, ring-shaped portion disposed radially outward of the coupling portion 234b of the vent 234 to provide a seating surface for the fasteners 236. So configured, it is just this outward-most radial portion of the top surface 225a of the flanges 225 that constitutes the seating surface for the fasteners 236.

Thus, the present invention is not limited to the specific embodiment(s) disclosed herein, but rather, is intended to be defined by the spirit and scope of the following claims and any and all equivalents thereof.

What is claimed is:

1. A fluid regulating device, comprising:
a control assembly comprising a piston slidably disposed on a piston axis, a control element slidably disposed on a control element axis that extends transverse to the piston axis, a control arm operably coupled between the piston and the control element, and a diaphragm operably connected to the piston for moving the piston, the control arm, and the control element in response to pressure changes across the diaphragm, the control element adapted for displacement to control the flow of a fluid through the regulating device;
a relief valve operably associated with the control assembly and adapted to provide overpressure protection to the regulating device;
an actuator housing defining a cavity containing at least a portion of the control assembly, the actuator housing comprising an upper housing component and a lower housing component, the upper and lower housing components each comprising a flange disposed adjacent a peripheral portion of the diaphragm;
a plurality of fasteners securing the flanges of the upper and lower housing components together to seal the peripheral portion of the diaphragm therebetween;
a vent defined by the upper housing component and containing the relief valve, the vent comprising an L-shaped conduit including an upright portion extending upward from a shell portion of the upper housing component and a coupling portion extending from the upright portion and defining an opening at an end thereof, the coupling portion being disposed entirely unsupported above a top surface of the flange of the upper housing component;

a seating surface defined by the top surface of the flange of the upper housing component, against which the plurality of fasteners seat, the seating surface comprising a continuous and unobstructed ring-shaped surface providing unobstructed access to the plurality of fasteners; and a parting line carried by the upper housing component of the actuator housing as a result of manufacturing, the parting line having an L-shaped portion including a first leg extending along an outer surface of the coupling portion from the opening of the coupling portion to the upright portion, and a second leg extending along an outer surface of the upright portion from the coupling portion to the shell portion of the upper housing component.

2. The device of claim 1, wherein the seating surface comprises the entire top surface of the flange of the upper housing component.

3. The device of claim 1, further comprising a plurality of apertures defined within and circumferentially spaced about the flanges of the upper and lower housing components, the apertures receiving the plurality of fasteners.

4. The device of claim 1, wherein each of the plurality of fasteners comprises a hexagonal bolt.

5. The device of claim 1, wherein the coupling portion of the vent defines an opening in fluid communication with the atmosphere, the opening comprising a dimension of at least 2 and ½ inches.

6. The device of claim 1, wherein the vent is integrally formed with the upper housing component.

7. The device of claim 1, wherein the coupling portion is cantilevered from the upright portion.

8. The device of claim 1, wherein the coupling portion of the vent defines an opening in fluid communication with the atmosphere, the opening disposed at an end of the coupling portion that is opposite the upright portion of the vent, the coupling portion being uniformly cylindrical between the opening and the upright portion.

9. The device of claim 1, wherein the parting line further includes a third leg extending along the shell portion of the upper housing component from the upright portion to the flange and a fourth leg extending radially across the flange from the third leg to a perimeter edge of the upper housing component.

10. The device of claim 9, wherein the first, second, third, and fourth legs of the parting line are disposed in a common plane.

11. A fluid regulating device, comprising:

a control assembly comprising a piston slidably disposed on a piston axis, a control element slidably disposed on a control element axis that extends transverse to the piston axis, a control arm operably coupled between the piston and the control element, and a diaphragm operably connected to the piston for moving the piston, the control arm, and the control element in response to pressure changes across the diaphragm, the control element adapted for displacement to control the flow of a fluid through the regulating device;

a relief valve operably associated with the control assembly and adapted to provide overpressure protection to the regulating device;

an actuator housing defining a cavity containing at least a portion of the control assembly, the actuator housing comprising an upper housing component and a lower housing component, the upper and lower housing components each comprising a flange disposed adjacent to a peripheral portion of the diaphragm;

a plurality of hexagonal bolts securing the flanges of the upper and lower housing components together to seal the peripheral portion of the diaphragm therebetween, each of the hexagonal bolts comprising a head seated against a top surface of the flange of the upper housing component;

a vent extending from a shell portion of the upper housing component and containing the relief valve, the vent comprising an L-shaped conduit including an upright portion and a coupling portion that is cantilevered from the upright portion and defines an opening at an end thereof, the coupling portion disposed entirely unsupported above a top surface of the flange of the upper housing component such that the top surface of the flange comprises a continuous and unobstructed ring-shaped surface providing unobstructed access to each of the heads of the plurality of hexagonal bolts; and a parting line carried by the upper housing component of the actuator housing as a result of manufacturing, the parting line having an L-shaped portion including a first leg extending along an outer surface of the coupling portion from the opening of the coupling portion to the upright portion, and a second leg extending along an outer surface of the upright portion from the coupling portion to the shell portion of the upper housing component.

12. The device of claim 11, further comprising a plurality of apertures defined within and circumferentially spaced about the flanges of the upper and lower housing components, the apertures receiving the plurality of hexagonal bolts.

13. The device of claim 11, wherein the coupling portion of the vent defines an opening in fluid communication with the atmosphere, the opening comprising a dimension of at least 2 and ½ inches.

14. The device of claim 11, wherein the vent is integrally formed with the upper housing component.

15. The device of claim 11, wherein the coupling portion of the vent defines an opening in fluid communication with the atmosphere, the opening disposed at an end of the coupling portion that is opposite the upright portion of the vent, the coupling portion being uniformly cylindrical between the opening and the upright portion.

16. The device of claim 11, wherein the parting line further includes a third leg extending along the shell portion of the upper housing component from the upright portion to the flange and a fourth leg extending radially across the flange from the third leg to a perimeter edge of the upper housing component.

17. The device of claim 16, wherein the first, second, third, and fourth legs of the parting line are disposed in a common plane.

18. An actuator housing for a fluid regulating device, the actuator housing comprising:

an upper housing component comprising a circumferential flange defining a plurality of circumferentially spaced apertures;

a lower housing component comprising a circumferential flange defining a plurality of circumferentially spaced apertures, the apertures in the flanges of the upper and lower housing components adapted to receive a plurality of fasteners for sealingly securing a diaphragm of a control assembly of a fluid regulating device therebetween;

a vent extending from a shell portion of the upper housing component and adapted to contain a relief valve of a fluid regulating device, the vent comprising an L-shaped conduit including an upright portion and a coupling portion that is cantilevered from the upright portion and which defines an opening at an end thereof, the coupling portion disposed entirely unsupported above a top surface of the flange of the upper housing component;

a seating surface defined by the top surface of the flange of the upper housing component, against which the plurality of fasteners are adapted to seat, the seating surface comprising a continuous and unobstructed ring-shaped surface providing unobstructed access to the plurality of fasteners; and a parting line carried by the upper housing component of the actuator housing as a result of manufacturing, the parting line having an L-shaped portion including a first leg extending along an outer surface of the coupling portion of the vent from the opening of the coupling portion to the upright portion, and a second leg extending along an outer surface of the upright portion of the vent from the coupling portion to the shell portion of the upper housing component.

19. The actuator of claim 18, wherein the seating surface comprises the entire top surface of the flange of the upper housing component.

20. The actuator of claim 18, wherein the coupling portion of the vent defines an opening in fluid communication with the atmosphere, the opening comprising a dimension of at least 2 and ½ inches.

21. The actuator of claim 18, wherein the vent is integrally formed with the upper housing component.

22. The actuator of claim 18, wherein the coupling portion of the vent defines an opening in fluid communication with the atmosphere, the opening disposed at an end of the coupling portion that is opposite the upright portion of the vent, the coupling portion being uniformly cylindrical between the opening and the upright portion.

23. The actuator of claim 18, wherein the parting line further includes a third leg extending along the shell portion of the upper housing component from the upright portion to the flange and a fourth leg extending radially across the flange from the third leg to a perimeter edge of the upper housing component.

24. The device of claim 23, wherein the first, second, third, and fourth legs of the parting line are disposed in a common plane.

* * * * *

UNITED STATES PATENT AND TRADEMARK OFFICE
CERTIFICATE OF CORRECTION

PATENT NO.         : 8,464,999 B2
APPLICATION NO.    : 12/105862
DATED              : June 18, 2013
INVENTOR(S)        : James C. Hawkins Page 1 of 1

Figure 2:
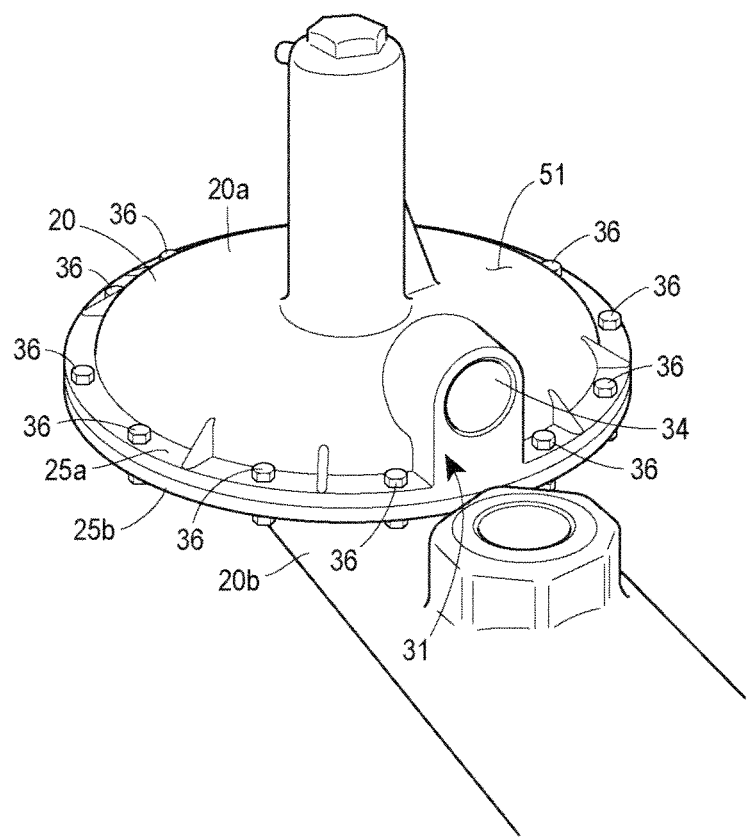
FIG. 2 is a perspective view of one conventional regulator housing including a vent for accommodating a low capacity relief valve.
Figure 3:
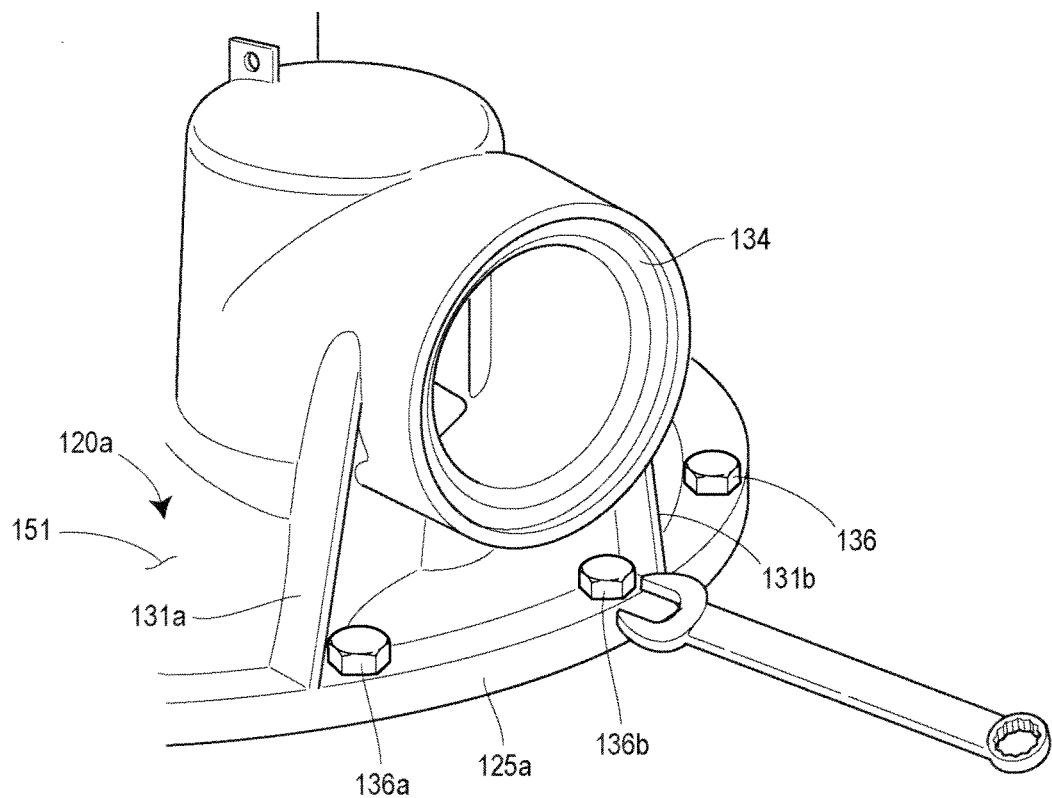
FIG. 3 is a partial perspective view of another conventional regulator housing including a vent for accommodating a high capacity relief valve.

It is certified that error appears in the above-identified patent and that said Letters Patent is hereby corrected as shown below:

In the Specification:

At Column 3, line 5, "FIG. 20" should be -- FIG. 2 --.

At Column 3, line 34, "portion 34" should be -- portion 31 --.

At Column 5, line 61, "flange 225a" should be -- flange 225 --.

In the Claims:

Column 10, line 21, Claim 24 "device" should be -- actuator --.

Signed and Sealed this
Thirty-first Day of March, 2015

Michelle K. Lee
*Director of the United States Patent and Trademark Office*